Figure 1:
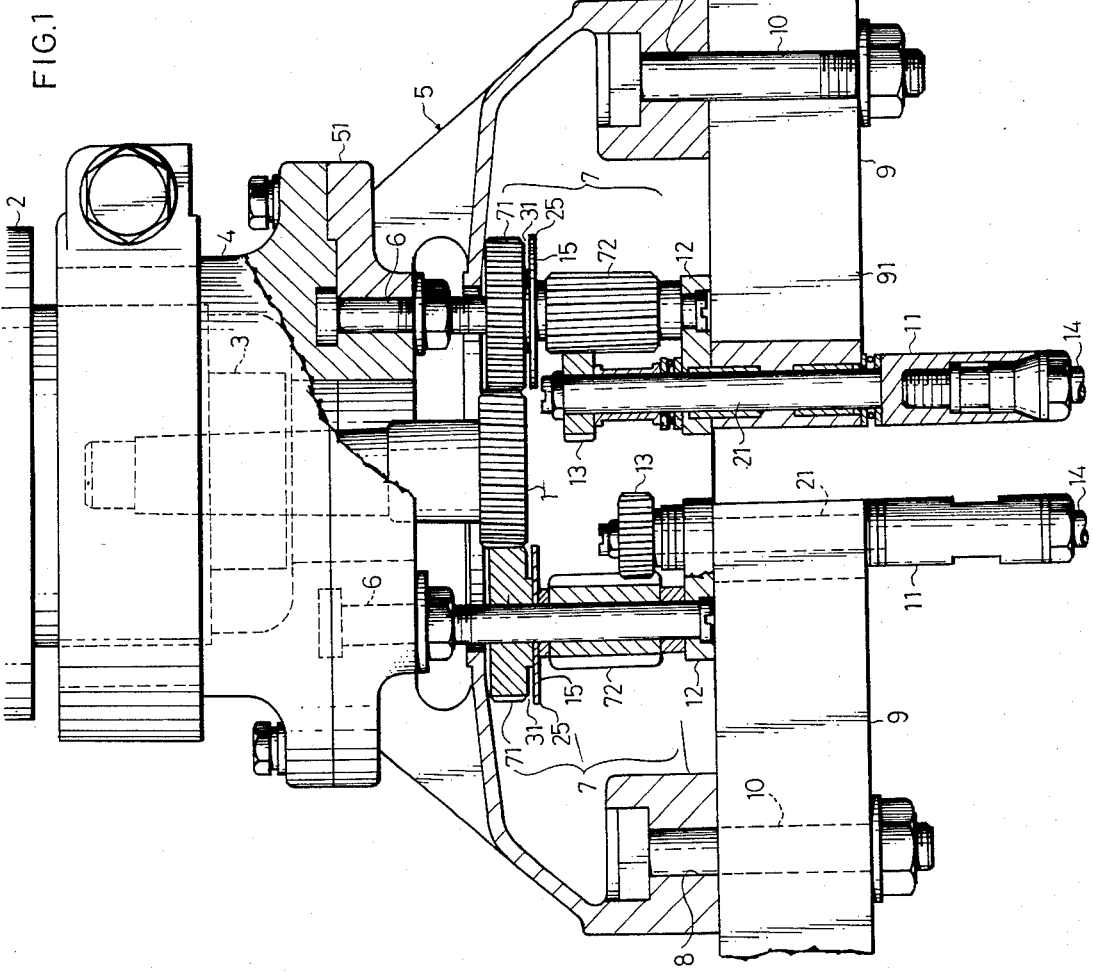
Figure 2:
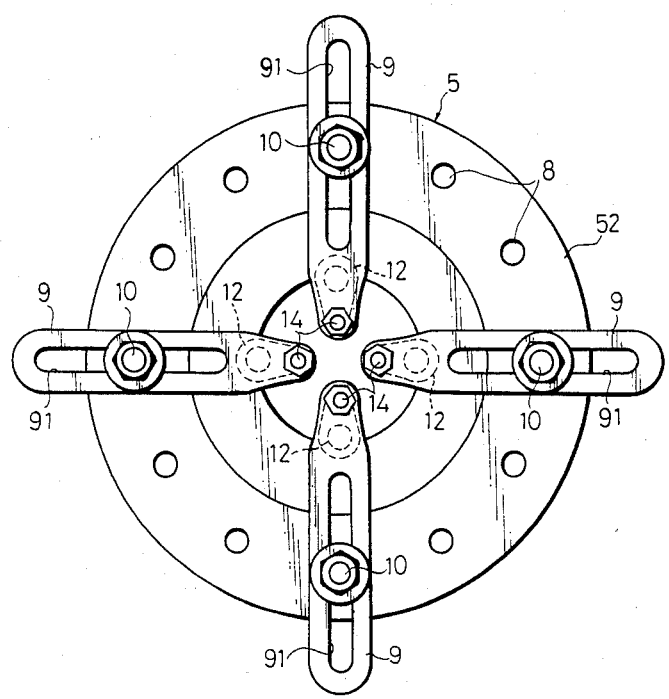

United States Patent [19]

Miyakawa

[11] Patent Number: 4,517,857
[45] Date of Patent: May 21, 1985

[54] GEAR INTERFERENCE PREVENTING MECHANISM IN MULTI-SPINDLE HEAD ATTACHMENT

[75] Inventor: Eiji Miyakawa, Tokyo, Japan

[73] Assignee: Miyakawa Industry Co., Ltd., Japan

[21] Appl. No.: 466,779

[22] Filed: Feb. 16, 1983

[51] Int. Cl.³ .............................................. F16H 37/06
[52] U.S. Cl. ................... 74/665 GA; 74/397; 74/431; 409/230
[58] Field of Search .................. 74/392, 397, 431, 432, 74/665 GA; 408/42; 409/230

[56] References Cited

U.S. PATENT DOCUMENTS 4,305,189 12/1981 Miyakawa .............................. 29/50
4,365,916 12/1982 Miyakawa .................. 74/665 GA X Primary Examiner—Leslie A. Braun
Assistant Examiner—Dwight G. Diehl
Attorney, Agent, or Firm—Leydig, Voit, Osann, Mayer & Holt, Ltd.

[57] ABSTRACT

A multi-spindle head attachment in which a positively rotated main spindle gear is meshed with a plurality of intermediate gears which are, in turn, meshed with spindle gears fitted respectively onto spindles each adapted to grip a drill, a tap or the like. Further, one of the spindles can be located in the position where its axis is aligned with the center of axis of the main spindle gear. Disc-like interference preventing members for preventing interference between the intermediate gears and the spindle gears, are provided to the intermediate gears and/or the spindle gears. Each interference preventing member has a diameter slightly larger than that of its corresponding addendum circle of the intermediate gear or spindle gear, and therefore its outer peripheral surface protrudes from the addendum circle of each gear. A slight gap is formed between each interference preventing member and the end face of each gear.

8 Claims, 7 Drawing Figures

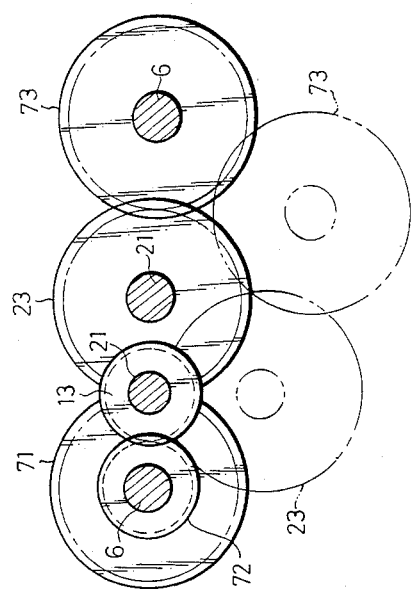
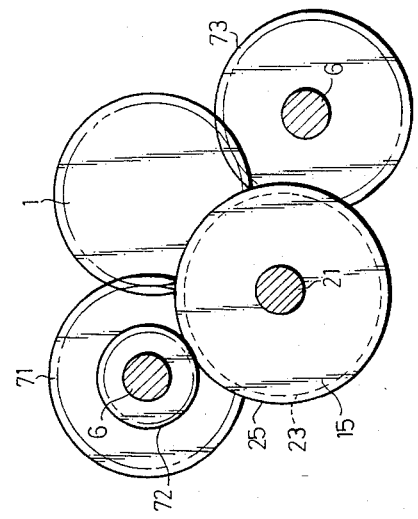

GEAR INTERFERENCE PREVENTING MECHANISM IN MULTI-SPINDLE HEAD ATTACHMENT

FIELD OF THE INVENTION

The present invention relates to a gear interference preventing mechanism in a multi-spindle head attachment attached, in use, to a drilling machine, a tapping machine or the like, for preventing gears disposed in the multi-spindle head attachment from interfering with one another.

OBJECT OF THE INVENTION

An object of the present invention is to provide a gear interference preventing mechanism adapted to prevent interference among intermediate gears and a spindle gear in a multi-spindle head attachment so that their gear teeth are prevented from being damage due to touching between their gear teeth tips.

Another object of the present invention is to provide a gear interference preventing mechanism adapted to eliminate the accumulation of dirt or dust on the gear teeth so that the meshing of the gears is prevented from deteriorating, even under the presence of interference preventing members.

A further object of the present invention is to provide a gear interference preventing mechanism with enables one of a plurality of spindles to be positioned directly below the center of the multi-spindle head or the main spindle gear thereof.

Other objects and advantages of the present invention will be apparent when preferred embodiments of the present invention, which will be explained hereinunder, are understood, and will be clearly readable in appendant claims. Further, several advantages which are not mentioned in this description are realized by those skilled in the art when the present invention is practically carried out.

BRIEF DESCRIPTION OF THE DRAWINGS

FIG. 1 is a front view partially broken away, illustrating a multi-spindle head attachment in the first embodiment of the present invention;

FIG. 2 is a bottom view in a contraction scale, illustrating the attaching arrangement of spindle holders with respect to the multi-spindle head of the multi-spindle head attachment shown in FIG. 1;

FIG. 3 is a partial bottom view illustrating the meshing arrangement of a plurality of gears in the multi-spindle head and as well the interference condition among intermediate gears therein;

FIG. 4 is a partial bottom view illustrating the interference preventing function of interference preventing plates fitted to the intermediate gears;

FIG. 5 is a front view partially broken away, illustrating a multi-spindle head attachment in a second embodiment of the present invention;

FIG. 6 is a partial bottom view illustrating the meshing arrangement of a plurality of gears in the multi-spindle head shown in FIG. 5 and as well the interference condition among intermediate gears therein; and FIG. 7 is a partial bottom view illustrating the interference preventing function of interference preventing plates fitted to the intermediate gears.

DETAILED DESCRIPTION OF THE PREFERRED EMBODIMENTS

Referring to FIGS. 1 to 4, explanation will be made for the first embodiment of the present invention as applied to a drilling machine.

A main spindle gear 1 projecting downward from a main spindle 3 in a quill 2 of the drilling machine is adapted to be inserted into the center portion of a multi-spindle head 5 from the top thereof which is removably attached to the bottom of the quill 2 through an attachment 4. A plurality of supporting shafts 6 are circumferentially arranged relating to a disc portion 51 at the top of the multi-spindle head 5, and have their lower portions rotatably fitted with intermediate gear assemblies 7. Each intermediate gear assembly 7 includes an upper intermediate gear 71 meshed with the main spindle gear 1 and a lower intermediate gear 72. The upper intermediate gear 71 has a diameter and a face width which are equal to those of the main spindle gear 1, and the lower intermediate gear 72 has smaller diameter but a larger face width than those of the upper intermediate gear 71.

A ring-shaped mounting portion 52 of the lower portion of the multi-spindle head 5 is formed in the circumferential arrangement with a plurality of mounting holes 8 as shown in FIG. 2. A plurality a spindle holders 9 in the same numbers as that of the intermediate gear assemblies 7 are attached to the lower surface of the mounting portion 52 by means of mounting bolts 10 inserted through elongated holes 91 respectively formed in the spindle holders 9, corresponding to selected some of the mounting holes 8. Therefore, each spindle holder 9 can be adjustably moved the extent of the length of the elongated hole 91, and as well can be adjustably rotated about the mounting bolt 10. At the inner end of each spindle holder 9 which is positioned inwards from the ring-shaped mounting portion 52, is rotatably carried a spindle 11 having a shaft portion 21 piercing through the spindle holder 9 and projecting into the multi-spindle head 5.

A holder arm 12 positioned to be in contact with the upper surface of the inner end portion of each spindle holder 9 has a base end portion pierced with the shaft portion 21 of each spindle 11, and a forward end portion rotatably receiving the lower end portion of the supporting shaft 6 of each intermediate gear assembly 7, thereby to keep each space between the supporting shaft 6 and the shaft portion 21 of the spindle 11 constant. Each spindle shaft portion 21 is fitted at its upper end with a spindle gear 13 meshed with a lower intermediate gear 72 and having a diameter equal to, and a face width smaller than the lower intermediate gear 72. Further, these spindle gears 13 are vertically shifted so as to prevent them from interfering with one another. Furthermore, each spindle 11 is adapted to have attached at its lower end a drill 14.

With the multi-spindle attachment thus arranged, the rotation of the main spindle gear 1 is transmitted to the spindle gear 13 by the aid of the upper and lower intermediate gears 71, 72, so that the spindles 11 and the drills 14 are rotated.

In this first embodiment, there are provided disc-like interference preventing plates 15, made of resin, each facing the end face of each upper intermediate gear 71. The diameter of the interference preventing plate 15 is slightly larger than the diameter of the addendum circle of the upper intermediate gear 71, and therefore the outer peripheral surface 25 of the interference preventing plate 15 protrudes outwards from the tooth crest of the upper intermediate gear 71. Further, the interference preventing plates 15 are positioned below the lower end face of the main spindle gear 1. A slight gap 31 is defined between each interference preventing plate 15 and the lower end face of the upper intermediate gear 71.

Figure 3:
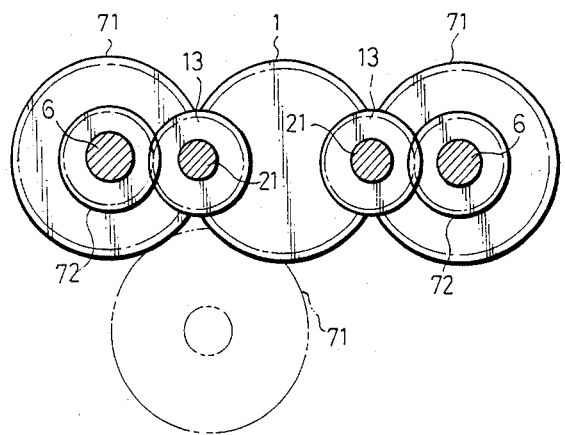

Prior multi-spindle head attachments have had no such interference preventing plates so that, when the upper intermediate gears 71 are moved toward each other in order to change the positions of the drills 14 as shown by the phantom line in FIG. 3, the tooth tips thereof are subject to coming into contact with each other, resulting in chipping of the teeth.

Figure 4:
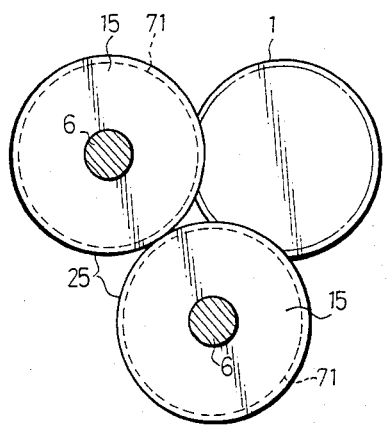

However, in this first embodiment, since the outer peripheral surfaces of the interference preventing plates 15 come into contact with each other before two upper intermediate gears 71 come into contact as shown in FIG. 4. Even when the upper intermediate gears are moved toward each other as above mentioned, there is no way in which the tooth tips of the upper intermediate gears 71 can come into contact and cause the teeth to be chipped. It is to be noted that the interference preventing plates 15 adjacent to each other are slightly separate from one another in their practical use. Further, since gaps 31 are provided fine dust adhering to the face of the tooth root of each upper intermediate gear 71 travels to the face end of the upper intermediate gear 71 during the meshing between the gears 1, 71, and then gradually enters into the gaps 31 without being accumulated on the face of the tooth root of the gear 71. Therefore, there is no deterioration of the meshing between the intermediate gears 71 and the main spindle gear 1.

Figure 5:
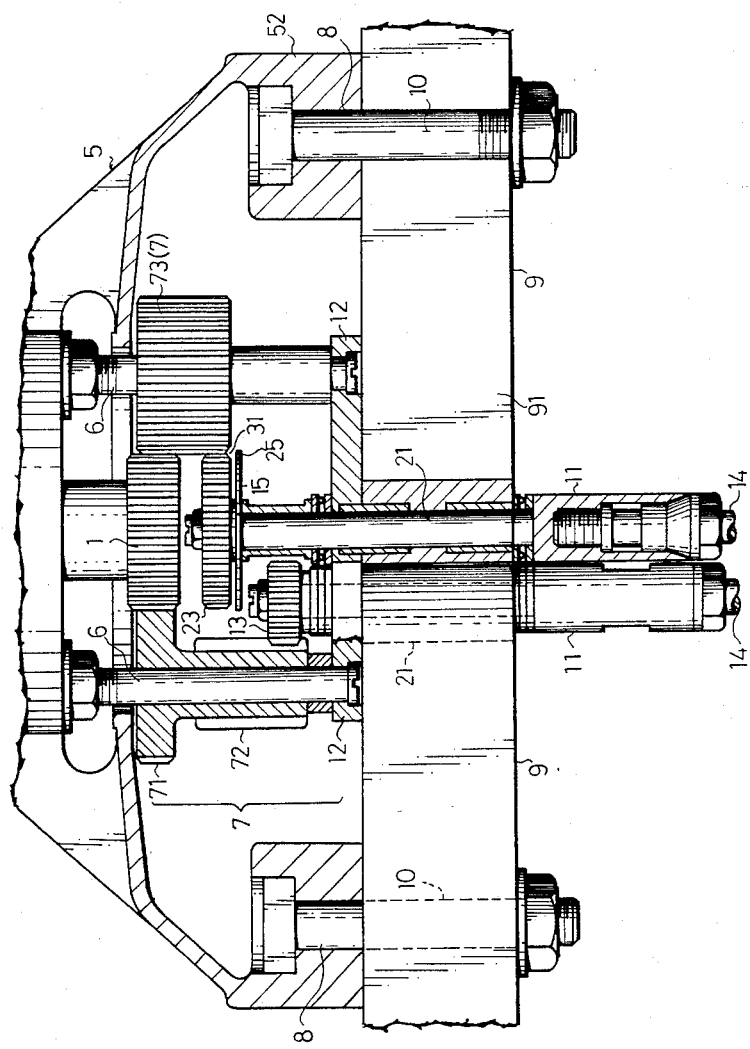

Next, referring to FIGS. 5 to 7, the second embodiment of the present invention will be explained. In this embodiment, a difference from the above-mentioned first embodiment is that one of the intermediate gear assemblies 7 has no lower intermediate gear 72 but has only one intermediate gear 73 having a face width larger than that of the upper intermediate gears 71 of the other intermediate gear assemblies 7. Further, this intermediate gear 73 is directly meshed with a spindle gear 23 having a diameter larger than that of the other spindle gears 13 but equal to the diameter of the main spindle gear 1 and the diameter of the intermediate gear 73.

Due to the provision of this larger diameter spindle gear 23, the spindle 11 corresponding thereto can be aligned with the center of the main spindle gear 1. Therefore, the drill 14 attached to the lower end of this spindle 11 can be used to make a hole in the position corresponding to the center of the multi-spindle head 5.

In this second embodiment, when the larger diameter spindle gear 23 and any one of the lower intermediate gears 72 come close to each other as shown by the phantom line in FIG. 6, it is possible for their teeth tips to come into contact, thereby causing chipping. However, in this second embodiment, an interference preventing plate 15 similar to those in the first embodiment is provided, facing the lower end face of the larger diameter spindle gear 23. This interference preventing plate 15 comes into contact with the lower intermediate gears 72 as shown in FIG. 7 so that there is no chance of the tooth tips of these spindle gears 72 and the larger diameter spindle gear 23 coming into contact with one another. Further, this interference preventing plate 15 is positioned slightly apart from the lower intermediate gears 72 in the practical use of the multi-spindle head attachment. Further, in this embodiment, the gap 31 is also formed for the purpose as mentioned in the first embodiment.

The interference preventing plates 15 in both first and second embodiments may be made of any of numerous metals, whereby it may be integrally formed with the upper intermediate gear 71 or with the spindle gear 23.

The afore-mentioned interference preventing mechanism can also be utilized in a tapping machine. Further, the multi-spindle attachment having such interference preventing mechanism can also be horizontally laid for use.

Although the present invention has been described in considerable detail with respect to certain preferred embodiments, it will be apparent that the present invention is capable of numerous modifications and variations apparent to those skilled in the art without departing from the spirit and scope of the present invention as only limited by the appended claims.

What is claimed is:

1. A gear interference preventing mechanism in a multi-spindle head attachment comprising: a main spindle gear adapted to be rotatably driven by a drive source in a drilling machine, tapping machine or the like; a plurality of intermediate gears adjacent to one another and meshed with said main spindle gear; a plurality of adjacent spindles each having a spindle gear meshed with one of said intermediate gears, each of said spindles being rotatably attached to said multi-spindle head attachment through a spindle holder and having its end adapted to grip a drill or a tap; and at least one gear interference preventing plate located adjacent to and spaced from the teeth of said gears and said plate being axially aligned with said gear, said plate preventing an interference between said adjacent gears.

2. The gear interference preventing mechanism of claim 1, wherein one of said plural spindle gears has a larger diameter than the others and is positioned in alignment with the axis of said main spindle gear.

3. The gear interference preventing mechanism of claim 2, wherein said gear interference preventing plate is attached to said spindle gear of larger diameter.

4. The gear interference preventing mechanism of claim 3, wherein said gear interference preventing plate has a diameter slightly larger than that of the addendum circle of said spindle gear of larger diameter, and the outer peripheral surface thereof protrudes outward from the tooth crest of said gear so as to prevent said gear from contacting adjacent spindle gears.

5. The gear interference preventing mechanism of claim 4, wherein said gear interference preventing plate is mounted facing one end face of said spindle gear of larger diameter, thereby forming a gap therebetween for allowing dust adhered to the tooth root of said gear to travel from said tooth root to the end face of said gear and to be released to the outside of said gear.

6. The gear interference preventing mechanism of claim 1, wherein at least one of said plurality of intermediate gears has a gear interference preventing plate attached thereto.

7. The gear interference preventing mechanism of claim 6, wherein said mechanism includes a plurality of interference preventing plates, wherein each of said gear interference preventing plates has a diameter slightly larger than that of the addendum circle of said intermediate gear to which it is attached, and the outer peripheral surface thereof protrudes outward from the tooth crest of said gear so as to prevent said gear from contacting adjacent gears.

8. The gear interference preventing mechanism of claim 7, wherein each of said gear interference preventing plates is mounted facing one end face of said gear to which it is attached, thereby forming a gap therebetween for allowing dust adhered to the tooth of said gear to travel from said tooth root to the end face of said gear and to be released to the outside of said gear.

* * * * *